United States Patent Office 2,865,872

Patented Dec. 23, 1958

2,865,872

GRAFT COPOLYMERS OF ACRYLONITRILE AND ANOTHER ETHENOID MONOMER WITH A HYDROXYL-CONTAINING CELLULOSE DERIVATIVE AND THEIR PREPARATION

Hugh J. Hagemeyer, Jr., Longview, Tex., and Elizabeth L. Oglesby, Kingsport, Tenn., assignors to Eastman Kodak Company, Rochester, N. Y., a corporation of New Jersey No Drawing. Application October 22, 1954
Serial No. 464,180

8 Claims. (Cl. 260—17)

This invention relates to the preparation of composite unitary polymers capable of forming readily dyeable unsegmented fibers by the graft copolymerization of a hydroxyl-containing cellulose ester or ether and a mixture of acrylonitrile and another ethenoid monomer, and to the polymers formed thereby.

Acrylonitrile has been widely used in the preparation of various polymers which are characterized by insolubility, or very low solubility, in many of the usual organic solvents. Many of these polymers, especially those containing high percentages of acrylonitrile, are further characterized by their lack of susceptibility to organic dyes. Acrylonitrile fibers have shown utility because of their excellent mechanical and physical properties, but the low dyeability and relative insolubility has limited the usefulness of polyacrylonitrile in the fiber field.

Attempts have been made to increase the dyeability of polyacrylonitrile fibers by interpolymerizing acrylonitrile with certain monomers whose polymers have an affinity for dyes. The preparation of copolymers of this kind often gives fibers having good dyeing properties, but usually the increased dyeability is obtained by sacrificing the high softening point of the fiber. For example, an interpolymer of acrylonitrile and vinyl acetate containing about 80% by weight of acrylonitrile and 20% by weight of vinyl acetate in the polymer molecule, can be drawn into readily dyeable fibers, but the softening point of such fibers is in the range of about 150–170° C. which is too low for practical purposes.

Other attempts have been made to increase the dyeability of polyacrylonitrile by mixing the polyacrylonitrile, before spinning, with other polymeric materials which are dye susceptible. Although such mixtures usually form fibers having good dyeing properties, fibers prepared from such mixtures usually show low softening points and many show segmentation into individual components along the horizontal axis. Thus, for example, mixtures of polyacrylonitrile and cellulose derivatives, such as cellulose acetate, can be dissolved in dimethylformamide and fibers spun from the resulting solution. The resulting fibers prepared from such mixtures, have the disadvantages of being prone to undergo segmentation and are usually too brittle and too difficult to draft to be useful as practical fiber materials. Such mixtures often show low strength and low elongation. These same defects are apparent when the mixture of polymers is extruded into fibers.

It is accordingly an object of this invention to provide new composite unitary polymers which are capable of forming readily dyeable fibers which show no objectionable tendency toward segmentation and which have the desirable physical properties ordinarily associated with polyacrylonitrile fibers together with exceptionally good elongation characteristics.

It is also an object of this invention to provide a method of polymerizing mixtures of acrylonitrile and another vinylic monomer with certain hydroxyl-containing cellulose esters and ethers whereby the monomeric mixture forms a graft polymerizate with the cellulose ester or ether to give a unitary polymer structure wherein the acrylonitrile, other ethenoid monomer and the cellulose derivative and intimately bonded by strong secondary valence forces.

Another object of the invention is to prepare graft copolymers of acrylonitrile, a second polymerizable monomer and hydroxyl-containing derivatives suitable for the formation of films, fibers and the like having improved dyeing properties and elongation characteristics coupled with high softening points, good moisture absorption and high tensile strength.

Another object of the invention is to provide homogeneous polymer compositions from acrylonitrile and cellulose esters and ethers from which the individual components cannot be separated by extraction with common organic solvents.

Other objects will be apparent from the description and claims which follow.

These and other objects are attained by means of this invention wherein improved unitary composite polymers capable of forming readily dyeable unsegmented fibers are prepared by graft copolymerizing 10–50% by weight, and preferably 15–35%, of a cellulose ester or ether or mixed ester-ether, containing 10–70% and desirably 20–50% of the hydroxyl groups of cellulose in free form, with 95–50% by weight, and preferably 85–65%, of a monomeric mixture consisting of 75–98% by weight of monomeric acrylonitrile and 25–2% by weight of at least one other ethenoid comonomer, the graft copolymerization in accordance with the invention being effected by heating the mixture of cellulose derivative and monomeric material in the presence of a polymerization catalyst and 0.01–2.0 mole percent based on the monomeric material of an alkyl mercaptan wherein the alkyl group contains 4–18 carbon atoms. In this manner, composite unitary polymers are readily obtained wherein the acrylonitrile, comonomer and the cellulose derivative are actually combined into a homogeneous polymeric structure, and the polymers thus formed are capable of being used in the manufacture of fibers, films and foils having superior properties. For example, the fibers prepared from such polymers by the usual spinning methods, when drafted, are strong and elastic, high melting, and low shrinking, as well as being white and lustrous. The fibers possess a remarkable affinity for acetate and basic type dyes. The polymers are also readily soluble in dimethyl formamide and similar solvents to give clear, smooth dopes of light color. Thus the polymers can be used for wet spinning in accordance with usual practice, or they can also be used in the usual dry spinning processes. Unlike mixtures of the corresponding cellulose derivatives and polyacrylonitrile, solutions of the unitary graft polymers embodying this invention are homogeneous and show no tendency to separate into layers on standing. Furthermore, the fibers show none of the tendency towards segmentation which is characteristic of mixtures of polyacrylonitrile and cellulose esters or ethers. In addition, the presence of the copolymerized comonomer imparts improved elongation over that obtained using acrylonitrile alone.

The improved unitary polymers embodying the invention can be prepared from mixtures of 5–50% by weight of cellulose derivative as defined herein and 95–50% by weight of monomeric material. In practicing the invention, any of the lower alkyl or lower carboxyalkyl ethers of cellulose or the lower acyl esters of cellulose can be employed provided the cellulose derivative contains from 10 to 70%, and desirably from 20 to 50%, of the hydroxyl groups of the cellulose in free form. If the cellulose derivative contains a lower free hydroxyl concentration than 10%, the dye affinity of the graft polymer is greatly reduced. Conversely, when the free hydroxyl concentration is too high, that is, above 70%, it is difficult to carry the graft polymerization out to a degree in which a compatible, soluble graft polymer is obtained. The cellulose derivatives employed can be either esters or ethers, including both the alkyl ethers wherein the alkyl groups contain 1–4 carbon atoms, the carboxyalkyl ethers wherein the carboxylalkyl groups contain 2–5 carbon atoms, the acyl esters wherein the acyl groups contain 2–5 carbon atoms, and the mixed ester-ethers, as well as mixed esters and mixed ethers. Thus typical cellulose derivatives embodying the invention include, but are not limited to, such compounds as methyl cellulose, ethyl cellulose, propyl cellulose, butyl cellulose, carboxymethyl cellulose, carboxyethyl cellulose, methyl cellulose acetate, ethyl cellulose acetate, ethyl cellulose propionate, methyl cellulose propionate, cellulose acetate, cellulose diacetate, cellulose triacetate, cellulose acetate-propionate, cellulose butyrate, cellulose isobutyrate, cellulose acetate-butyrate, and the like. Specially activated cellulose derivatives such as partially hydrolyzed cellulose ethers maintained in an active swollen condition can be used if desired, although activation in this way is not necessary for good results. If desired, the cellulose derivative can be allowed to react in aqueous solution with acrylonitrile either before or during polymerization to form partially cyanoethylated cellulose derivatives. Thus, for example, cyanoethyl cellulose, ethyl cyanoethyl cellulose, and the like are suitably employed in the polymerization.

The comonomer which is employed in conjunction with the acrylonitrile as the monomeric material used in the graft polymerization can be any of the well known polymerizable ethenoid monomers characterized by the presence of a single unsaturated group of the formula $$-CH=C<$$

and desirably of the formula $$CH_2=C<$$

The monomeric material employed in the graft polymerization consists of 75–98% by weight of acrylonitrile and 25–2% by weight of at least one such other monoethylenically unsaturated monomer. The use of a comonomer with the acrylonitrile is of considerable utility, particularly in the use of the graft copolymers for manufacture of fibers because the comonomer greatly increases the elongation which the fiber will undergo without objectionably reducing the other desirable properties of the composite polymer such as high softening point, tensile strength in the range of 2.5–5 grams per denier, excellent dye affinity, good moisture absorption and similar advantageous properties obtained by graft polymerizing acrylonitrile as the sole monomer with the cellulose derivatives of the invention. The preparation and improved properties of the simple graft polymers prepared from hydroxyl-containing cellulose esters and ethers are disclosed in the copending application of Hagemeyer and Hull, Serial No. 464,179, filed October 22, 1954.

In practicing the present invention as herein defined, the comonomer can be any of a large number of vinylic monomers known to the art. Typical monomers which are suitable include the monoethylenically unsaturated carboxylic acid esters wherein the ester group contains 1–4 carbon atoms and the carboxylic acid group contains 2–5 carbon atoms. In such monomers, the ethenoid unsaturation can be either in the ester group as with vinyl acetate, vinyl propionate, vinyl butyrate, isopropenyl acetate or the like, or it can be in the acid itself such as in the methyl, ethyl, propyl or butyl esters of such unsaturated carboxylic acids as acrylic acid, methacrylic acid, maleic acid, itaconic acid, citraconic acid, fumaric acid, or the like. If desired, the polymerizable free acid such as acrylic acid or methacrylic acid can be suitably used.

Another particularly useful group of comonomers for use in practicing the invention are the polymerizable amides of the monoethylenic carboxylic acids of 2–5 carbon atoms, including the N-alkyl and N,N-dialkyl amides of such acids wherein such alkyl groups contain 1–4 carbon atoms. Thus for example, the acrylamides, methacrylamides, maleamides, fumaramides, citraconamides and itaconamides are suitable for use in practicing the invention. Similarly the vinyl pyridines, vinyl ketones, aryl vinyls, vinyl halides, vinylidene halides, substituted acrylonitriles, alkylene hydrocarbons, and similar polymerizable monoethylenic monomers are all suitable for use in practicing the invention.

Typical examples of comonomers which can be employed in conjunction with the acrylonitrile include but are not limited to styrene, α-methyl styrene, p-acetaminostyrene, α-acetoxystyrene, vinyl chloride, vinylidene chloride, ethyl vinyl ether, isopropyl vinyl ether, isopropenyl methyl ketone, ethyl isopropenyl ketone, methyl vinyl ketone, ethyl vinyl ketone, dimethyl maleate, diethyl maleate, diisopropyl maleate, dimethyl fumarate, diethyl fumarate, diisopropyl fumarate, acrylic acid, methacrylic acid, fumaronitrile, methacrylonitrile, N-vinyl phthalimide, vinyl acetate, vinyl butyrate, vinyl sulfonamide, ethylene, isobutylene, acrylamide, N-methyl acrylamide, N-ethyl acrylamide, N-isopropyl acrylamide, N-n-butyl acrylamide, methacrylamide, N-methyl methacrylamide, N-isopropyl methacrylamide, N,N-dimethyl acrylamide, N,N-dimethyl methacrylamide, 2-vinyl pyridine, 5-vinyl pyridine, 2-methyl-5-vinyl pyridine, maleamide, N-methyl maleamide, N-isopropyl maleamide, N,N'-dimethyl maleamide, N,N-tetramethyl maleamide, N-methyl-N'-ethyl maleamide, fumaramide, N-methyl fumaramide, N-ethyl fumaramide, N-n-butyl fumaramide, N,N'-dimethyl fumaramide, N-methyl-N'-isopropyl fumaramide, N,N'-tetraethyl fumaramide, itaconamide, N-methyl itaconamide, N,N'-diethyl itaconamide, diethyl itaconate, dimethyl itaconate, dibutyl itaconate, dimethyl citraconate, citraconamide, N-methyl citraconamide, N-ethyl citraconamide, N,N'-dimethyl citraconamide, N,N'-tetramethyl citraconamide, methyl maleamate, ethyl maleamate, n-butyl maleamate, N-methyl methyl maleamate, N-ethyl ethyl maleamate, N-dimethyl methyl maleamate, methyl fumaramate, propyl fumaramate, N-methyl methyl fumaramate, N-methyl ethyl fumaramate, N-dimethyl butyl fumaramate, methyl itaconamate, ethyl itaconamate, N-methyl propyl itaconamate, N-dimethyl methyl itaconamate, methyl citraconamate, ethyl citraconamate, N-methyl methyl citraconamate, N-dimethyl ethyl citraconamate, methyl acrylate, ethyl acrylate, isobutyl acrylate, methyl methacrylate, ethyl methacrylate, propyl methacrylate, vinyl formate, vinyl propionate and similar copolymerizable monoethylenic monomers. The use of such comonomer with the acrylonitrile in amounts of 2–25% by weight based on the combined weight of acrylonitrile and such comonomers gives enhanced elongation characteristics whereby fibers exhibiting elongation characteristics of 15% to 30% are readily prepared from the graft copolymers. The exact way in which the acrylonitrile, ethenoid comonomer and hydroxyl-containing cellulose ester or ether combine in the composite unitary graft copolymer in accordance with the invention is not clearly understood but would appear to be a concomitant copolymerization and graft copolymerization.

The graft copolymerization embodying this invention can be carried out in accordance with usual emulsion or solution polymerization techniques by heating the mixture of cellulose derivative and monomeric material in the presence of a polymerization catalyst until polymerization has proceeded to a point where from 60 to 100% of the monomeric material has combined with the cellulose derivative in a unitary polymeric structure. Any of the well known polymerization techniques can be employed, as, for example, by dissolving the cellulose ester in acrylonitrile and/or comonomer up to the limit of its solubility and adding the resulting dope to an emulsion containing the polymerization catalyst and mercaptan, or by first heating a mixture of the cellulose derivative and the acrylonitrile at reflux temperature before adding the aqueous solution containing emulsifier, catalyst and additional acrylonitrile and comonomer, if desired. Alternatively, the cellulose derivative and the monomeric mixture can be dispersed in an aqueous solution containing the polymerization catalyst and mercaptan and the polymerization effected by heating the resulting emulsion to a temperature of 30–100° C. and desirably 35–70° C.

In effecting the graft copolymerization, any of the well known polymerization catalysts can be employed with particularly good results being obtained with the peroxy catalysts such as peroxides as typified by hydrogen peroxide, benzoyl peroxide, cumene hydroperoxide, or tertiary butyl peroxide, per sulfates, perborates, and similar well known polymerization catalysts. If desired, Redox activated systems can be used in accordance with the usual polymerization practices. Thus, sodium bisulfite-potassium persulfate, hydrogen peroxide-ferrous ion, or benzoyl peroxide-sorbose-ferrous ammonium sulfate-sodium pyrophosphate-sodium stearate systems can be advantageously employed. Other particularly useful catalysts include lauroyl peroxide, diacetyl peroxide and peracetic acid. In addition to the usual Redox catalyst systems, it has also been found that cellulose derivatives and peroxy compounds often function as Redox systems without the addition of a reducing agent.

The improved polymers embodying the invention are obtained by effecting the graft polymerization in the presence of an alkyl mercaptan containing 4–18 carbon atoms in the alkyl group. The mercaptan controls the molecular weight distribution of the "copolymer" portion of the polymer under the polymerization conditions and also reacts with persulfates to give sulfhydryl radicals which act to initiate polymer chains. The mercaptan is employed in an amount of 0.01–2.0 mole percent based on the mixture of monomers employed, with particularly advantageous results being obtained using 0.05–1.0 mole percent of the mercaptan in the polymerization mixture. When the mercaptan is not employed in the polymerization, the polymer tends to be high in molecular weight and does not form a composite unitary structure suitable for spinning fibers. Instead, the precipitated films tend to be segmented as in mixtures and cannot be drafted. When larger amounts of mercaptan are used, the polymer is too low in molecular weight and filaments formed therefrom are clear and weak and plaster in the drafting tube and on the rolls. Any of the alkyl mercaptans having 4–18 carbon atoms in the alkyl group can be employed in practicing the invention. Typical alkyl mercaptans which are suitable include, but are not limited to, butyl mercaptan, octyl mercaptan, decyl mercaptan, myristyl mercaptan, lauryl mercaptan, and the like, with t-dodecylmercaptan being preferred.

When the polymerization is carried out in an aqueous emulsion, any of the well known emulsifying agents can be employed, such as the alkylated arylsulfonic acids, fatty alcohol sulfonates, sulfonated fatty acid amides, and the like. The polymerization is desirably carried out at a pH range of 5 to 7, and the emulsifiers which are desirably used are those which give an essentially neutral water solution and which have a maximum dispersing power. Thus, most soaps give solutions having a pH of about 8 which is higher than is desired for best results during the polymerization. Similarly, the non-ionic detergents usually give solutions which are too acidic for optimum results. When a highly active dispersing agent is employed in the pH range of 5 to 7, it is possible for the stirrer to break up and disperse the gummy polymer mass which forms at the beginning of the polymerization. The polymer product which is formed by the process embodying the invention is readily filtered and does not have to be coagulated. The granular polymer thus obtained also makes washing the polymer quite simple whereby unreacted acrylonitrile is easily washed out of the polymer and the color of the polymer is thereby maintained.

Although the cellulose derivative can form from 5 to 50% by weight of the final polymer, best results from the standpoint of stability and chemical resistance are obtained when the cellulose derivative forms less than 40% and more desirably from 15 to 35% of the final polymer. At cellulose component concentrations of 15 to 35% based on the weight of the polymer, the polymers are extremely resistant to extraction with organic solvents such as acetone and can be treated with 10% aqueous sulfuric acid without harmful effects. With more than 40% by weight of the cellulose derivative in the polymer, partial extraction with acetone is possible, and the polymer chars with sulfuric acid. The use of relatively large amounts of cellulose derivative in the polymer is desirable from the standpoint of dye affinity, however, and consequently the cellulose ester is preferably employed at concentrations of about 30% by weight. The presence of the ester or ether groups enhances the solubility of the polymer in such solvents as dimethyl formamide. The increasing concentration of such groups, however, tends to reduce the dye affinity, and it is therefore desirable to employ polymers having at least 20% of the hydroxyl groups in free form, although excellent results are obtained at free hydroxyl concentrations as low as 10%.

The polymeric products embodying the invention form smooth dopes which can be readily used for spinning fibers having high tensile strength, good elongation, greatly improved dye affinity, high softening point, and no objectionable tendency toward segmentation. Unlike mixtures of cellulose derivatives and polyacrylonitrile, the solvents employed in spinning do not extract away the cellulose ester or ether component, and as a result the fibers are homogeneous, non-brittle and can be readily oriented by drafting to give lustrous strong fibers. Chemical and physical examination of the products prepared in accordance with this invention indicate that the acrylonitrile, comonomer and the cellulose derivative are actually chemically combined to give a unitary composite polymer molecule. The exact mechanism by which the graft copolymerization takes place is not clearly understood, and the invention will not be limited by any theory which might be advanced by way of explanation. It is probable, however, that some addition of the acrylonitrile takes place with unreacted hydroxyl groups of the cellulose derivative to form a partly cyanoethylated product, and that other acrylonitrile and comonomer polymerizes in chains joined at active points to the cellulose molecule. The unitary character of the polymer results in high melting points, high strength and stretch, low shrinkage in hot water, and complete homogeneity in every respect. The high softening points of the polymers embodying this invention are of great importance for the use of such polymers in the manufacture of synthetic fibers. Furthermore, the polymers show excellent stability against leaching and weathering, and consequently the fabrics prepared from the polymers embodying this invention compare favorably with fabrics prepared from polyacrylonitrile alone. The greatly improved dye affinity of the polymers embodying this invention make them particularly useful for making mixed fabrics with polyacrylonitrile fibers for use in wearing apparel, suiting, coverings, awnings, and the like. The fibers of the invention can be employed either in the form of staple fibers or continuous filaments. The spun and drafted filaments are warm and soft and have an increased affinity for moisture. The improved elongation characteristics imparted by the comonomer are of particular importance in fiber applications.

The invention is illustrated by the following examples of preferred embodiments thereof, it being understood that the examples are included merely for purposes of illustration and are not intended to limit the scope of the invention unless otherwise specifically indicated.

*Example 1*

10 g. of Aerosol OT (dioctyl sodium sulfosuccinate) and 350 cc. of water were placed in a one-liter, 3-neck flask equipped with a reflux condenser, sweep stirrer, and thermometer. The whole was stirred until an emulsion had formed, and 20 cc. of a 3 percent solution of potassium persulfate, 0.5 g. of t-dodecyl mercaptan, 30 g. of redistilled vinyl acetate, 20 g. of cellulose acetate (38 percent acetyl), and 50 g. of redistilled acrylonitrile were added. The flask was deaerated with nitrogen gas, and the emulsion was stirred at room temperature (23° C.) for 10 minutes. It was then maintained at 40–60° C. for 2 hours. After breaking the emulsion with aqueous sodium chloride, the precipitate was collected on a filter, washed and dried. The yield was 90 percent of the theoretical. A 15 percent solution of the polymer in dimethylformamide was prepared and then spun into monofilament fibers. These fibers tested 3.02 grams per denier and had 17 percent elongation at break.

*Example 2*

20 g. of cellulose diacetate (33 percent acetyl), 64 g. of acrylonitrile, and 16 g. of isopropenyl acetate were added to an emulsion of 10 g. of Aerosol OT (dioctyl sodium sulfosuccinate) in 350 cc. of water. The flask was deaerated with nitrogen gas, and 20 cc. of a 3 percent solution of potassium persulfate and 0.13 g. of t-dodecylmercaptan were added. The emulsion was maintained at 54–67° C. for 1½ hours, and the emulsion broken with aqueous sodium chloride. The resulting precipitate was collected on a filter, washed with water twice, then with alcohol and dried. The yield was 75 percent of the theoretical. The polymer product was dissolved in dimethylformamide to give a 20 percent solution, which was spun into fibers having a tenacity of 3.07 grams per denier and 25 percent elongation. They showed good affinity for acetate dyes.

*Example 3*

In a 2-liter, 3-neck flask equipped with a Hershberg stirrer, reflux condenser and thermometer were placed 10 g. of Aerosol OT (dioctyl sodium sulfosuccinate), 350 cc. of water, and 16 g. of ethyl cellulose. While stirring, 80 g. of acrylonitrile, 4 g. of α-acetoxyacrylonitrile, 0.513 g. of t-dodecylmercaptan, and 20 cc. of a 3 percent solution of potassium persulfate were added. The air in the flask was displaced with nitrogen gas, and the reaction mixture was heated to 60° C. with stirring. It was maintained at 60–70° C. for 6 hours, and the emulsion then broken with aqueous sodium chloride. The precipitate was collected on a Büchner funnel, washed twice with water and dried. It weighed 79.8 g. A solution of the polymer product in dimethylformamide was extruded into fibers having a tenacity of 2.70 grams per denier (wet—2.48) and an elongation of 18.7 percent (wet—18.8).

*Example 4*

80 g. of acrylonitrile, 5 g. of diethyl itaconate, 15 g. of cellulose diacetate (34.9 percent acetyl), 350 cc. of water, 10 g. of Aerosol OT (dioctyl sodium sulfosuccinate), 20 cc. of a 3 percent solution of potassium persulfate, and 0.5 g. of t-dodecyl mercaptan were added to a flask, and the flask deaerated with nitrogen gas. The resulting emulsion was heated at 58–66° C. for 3 hours and then broken with aqueous sodium chloride. The precipitate was collected on a filter, washed and dried (86 percent yield). A mixture of 85.7 g. of the dried polymer and 14.3 g. of polyacrylonitrile was dissolved in dimethylformamide (16.7 percent solution) and the solution extruded into fibers. They had a tenacity of 2.58 grams per denier, 24 percent elongation, and an excellent affinity for acetate and direct dyes.

Similarly improved results are obtained in accordance with the processes of the preceding examples using any of the other cellulose esters, ethers or ester-ethers as defined herein as well as when using any of the ethenoid comonomers as described or any of the other alkyl mercaptans as defined within the relative ranges of proportions embodying the invention. Thus it will be understood that the process of the invention proceeds satisfactorily as described with any of the cellulose derivative-monomer combinations indicated as being within the scope of the invention to produce highly useful unitary composite polymers possessing the advantageous combination of chemical and physical properties as described, and that the examples are included merely to illustrate the best mode of practicing the invention.

As has been indicated, the polymerization can be carried out in accordance with any of the well known polymerization techniques. Thus, although the peroxy catalysts are preferably employed, such other well known catalysts as triethyl phosphate, organic azines, and the like can also be used to increase the speed of polymerization. The quantity of catalyst can be varied in accordance with usual practice although, ordinarily, from 0.01 to 2% by weight of catalyst based on the weight of monomers is sufficient for optimum results. Polymerization in aqueous medium is particularly suitable because it is thus possible to more conveniently use any of the water-soluble polymerization catalysts, such as the persulfates. The polymerization can be effected with or without a diluent, however, and it can be carried out in the presence of an organic solvent or in a mixture of organic solvent and water. Thus, an organic solvent miscible with water can be added to the aqueous medium and the polymerization carried out in solution, or an emulsifying agent can be added to the aqueous medium and the polymerization carried out in an emulsion, or a sufficient amount of water can be employed to effect the polymerization in aqueous solution.

For solution polymerization an aqueous acetone solution can be advantageously employed, although other solvents such as ethanol, N-propanol, isopropanol, and the like can be used.

As has been indicated, the particular emulsifying agent employed is not particularly critical, although it is desirable to employ an emulsifying agent so that the pH of the polymerization mixture is in the range of about 4 to 7. Although the sulfosuccinic acid esters and their alkali metal salts or amine addition salts are conveniently used, the alkali metal salts of aromatic sulfonic acids such as sodium isobutylnaphthalene sulfonate, the alkali metal salts of fatty alcohol sulfates such as sodium lauryl sulfate and the like can also be used. The complex reaction products obtained by reacting ethylene oxide with aliphatic alcohols and amines can be used in some cases but are less desirable because of the pH conditions.

As has been indicated, it is sometimes advantageous to heat the acrylonitrile and the cellulose derivative in admixture before adding the polymerization catalyst in order to increase the amount of cyanoethylation which takes place. This is often desirable since it increases the compatibility and homogeneity of the final products. When cyanoethylation is effected in this manner, the polymerization catalyst can then be added and heating continued until the polymerization is substantially complete.

In preparing the composite unitary polymers of this invention, the polymerization can be stopped at any desired point, although it is usually desirable to continue the polymerization until it is substantially complete in order to minimize the problems of recovering unreacted monomer. The polymers having a molecular weight of from about 40,000 to about 200,000 are particularly useful in the preparation of fibers. Best results are obtained when the reaction temperature is maintained after the time in which the reaction is exothermic in order to complete the polymerization. The unreacted monomer can be washed out of the final polymer, or the unreacted monomer can be distilled off under normal or reduced pressures. Ordinarily, it is desirable to effect the polymerization under an inert gas such as nitrogen or carbon dioxide, although this is not necessary in all cases. The reaction mixture resulting from the polymerization usually contains about 20 to 40% solids, and the polymer can usually be recovered, particularly from aqueous reaction mixtures, by filtering. When the polymer has a tendency to form an emulsion, the emulsion can be broken by heating the polymerization mixture with a 1–20% solution of sodium chloride, aluminum sulfate, or the like. The polymers can be readily air dried at 60–80° C., and the drying can be accelerated by using a low boiling solvent in the final washing steps.

The polymerization time will vary considerably depending upon the nature of the reactants, the amount and type of polymerization catalyst, the polymerization temperature, and similar variable factors. Ordinarily the polymerization can be readily effected in periods of from 10 to 20 minutes to 2 to 4 hours. The composite polymers of the invention are readily soluble in dimethyl formamide, although other solvents such as N,N-dimethylacetamide, ethylene carbamate, ethylene carbonate, N-methyl-2-pyrrolidone and $\gamma$-butyro lactone can be employed. Other solvents which can be used, although somewhat less advantageously, include such materials as N,N-dimethylmethoxyacetamide, dimethylcyanamide, N,N-dimethycyanoacetamide, N,N-dimethyl,$\beta$-cyanopropionamide, glycolonitrile, malononitrile ethylene cyanohydrin, dimethyl sulfoxide, and the like.

The polymers of this invention are particularly useful for forming high melting, strong, lustrous fibers having excellent dye affinity, but they are also suitable for use in the preparation of sheets, films, and the like. Thus, the polymers can be employed for casting or extruding clear sheets in the usual manner, and such sheets and films can be used as photographic film supports for either black-and-white or color film if desired. When used in photographic applications, the polymer films can be employed to carry photosensitive layers such as silver halide layers.

In preparing the polymers in accordance with this invention, the polymerization can be carried out either batchwise or in continuous fashion. In the continuous processes, the reactants as well as the catalysts and mercaptan can be continuously added to the polymerization system with continuous removal of polymer as it is formed. By a suitable choice of conditions, the use of reactants and the withdrawal of polymer can be correlated to give substantially complete polymerization in continuous fashion.

The polymers can also be used in admixture with other polymeric materials such as polyacrylonitrile with excellent results. The graft co-polymers of this invention exhibit a greater degree of compatibility with other polymeric materials than do the unmodified polymers known heretofore. It is understood that the polymers can also be used in admixture with fillers, dyes, pigments and other well known polymer additives in accordance with usual practice.

The invention has been described in detail with particular reference to certain preferred embodiments thereof, but it will be understood that variations and modifications can be effected within the spirit and scope of the invention as described hereinabove and as defined in the appended claims.

We claim:

1. The method which comprises graft copolymerizing a mixture of 5–50% by weight of a compound composed of cellulose having 10–70% of the hydroxyl groups of the cellulose in free form and having the hydrogen of the remainder of the hydroxyl groups replaced by radicals from the group consisting of alkyl groups of 1–4 carbon atoms, carboxyalkyl groups of 2–5 carbon atoms and acyl groups of 2–5 carbon atoms, and 95–50% by weight of monomeric material consisting of 75–98% by weight of acrylonitrile and 25–2% by weight of at least one other polymerizable monoethylenically unsaturated monomer based on the weight of said monomeric material and selected from the group consisting of monoethylenically unsaturated carboxylic acid esters wherein the ester group contains 1–4 carbon atoms and the carboxylic acid group contains 2–5 carbon atoms, amides and N-alkyl and N,N-dialkyl amides of monoethylenic carboxylic acids of 2–5 carbon atoms wherein said alkyl groups contain 1–4 carbon atoms, vinyl pyridines, styrene, vinyl chloride, vinylidene chloride, alkyl vinyl ethers wherein the alkyl group contains 1–3 carbon atoms, vinyl ketones containing 4–6 carbon atoms, acrylic acid and methacrylic acid, and thereby forming a composite unitary polymer capable of forming high softening, readily dyeable unsegmented fibers, said graft copolymerizing being effected by heating said mixture of cellulose compound and monomeric material in the presence of a polymerization catalyst and 0.01–2.0 mole percent based on the weight of said monomeric material of an alkyl mercaptan wherein the alkyl group contains 4–18 carbon atoms.

2. The product obtained according to the process of claim 1.

3. The method which comprises graft copolymerizing a mixture of 15–35% by weight of an alkyl ether of cellulose wherein the alkyl groups contain 1–4 carbon atoms and wherein 20–50% of the hydroxyl groups of the cellulose are in free form, and 85–65% by weight of monomeric material consisting of 75–98% by weight of acrylonitrile and 25–2% by weight of another polymerizable mono ethylenically unsaturated monomer based on the weight of said monomeric material and selected from the group consisting of monoethylenically unsaturated carboxylic acid esters wherein the ester group contains 1–4 carbon atoms and the carboxylic acid group contains 2–5 carbon atoms, amides and N-alkyl and N,N-dialkyl amides of monoethylenic carboxylic acids of 2–5 carbon atoms wherein said alkyl groups contain 1–4 carbon atoms, vinyl pyridines, styrene, vinyl chloride, vinylidene chloride, alkyl vinyl ethers wherein the alkyl group contains 1–3 carbon atoms, vinyl ketones containing 4–6 carbon atoms, acrylic acid and methacrylic acid, and thereby forming a composite unitary polymer capable of forming high softening, readily dyeable, unsegmented fibers, said graft copolymerizing being effected by heating said mixture in the presence of a polymerization catalyst and 0.05–1.0 mole percent based on the weight of said monomeric material of an alkyl mercaptan wherein the alkyl group contains 4–18 carbon atoms.

4. The method which comprises graft copolymerizing a mixture of 15–35% by weight of a carboxyalkyl ether of cellulose wherein the carboxyalkyl groups contain 2–5 carbon atoms and wherein 20–50% of the hydroxyl groups of the cellulose are in free form, and 85–65% by weight of monomeric material consisting of 75–98% by weight of acrylonitrile and 25–2% by weight of another polymerizable monoethylenically unsaturated monomer based on the weight of said monomeric material and selected from the group consisting of monoethylenically unsaturated carboxylic acid esters wherein the ester group contains 1–4 carbon atoms and the carboxylic acid group contains 2–5 carbon atoms, amides and N-alkyl and N,N-dialkyl amides of monoethylenic carboxylic acids of 2–5 carbon atoms wherein said alkyl groups contain 1–4 carbon atoms, vinyl pyridines, styrene, vinyl chloride, vinylidene chloride, alkyl vinyl ethers wherein the alkyl group contains 1–3 carbon atoms, vinyl ketones containing 4–6 carbon atoms, acrylic acid and methacrylic acid, and thereby forming a composite unitary polymer capable of forming high softening, readily dyeable, unsegmented fibers, said graft copolymerizing being effected by heating said mixture in the presence of a polymerization catalyst and 0.05–1.0 mole percent based on the weight of said monomeric material of an alkyl mercaptan wherein the alkyl group contains 4–18 carbon atoms.

5. The method which comprises graft copolymerizing a mixture of 15–35% by weight of cellulose acyl ester wherein the acyl groups contain 2–5 carbon atoms and wherein 20–50% of the hydroxyl groups of the cellulose are in free form, and 85–65% by weight of monomeric material consisting of 75–98% by weight of acrylonitrile and 25–2% by weight of another polymerizable monoethylenically unsaturated monomer based on the weight of said monomeric material and selected from the group consisting of monoethylenically unsaturated carboxylic acid esters wherein the ester group contains 1–4 carbon atoms and the carboxylic acid group contains 2–5 carbon atoms, amides and N-alkyl and N,N-dialkyl amides of monoethylenic carboxylic acids of 2–5 carbon atoms wherein said alkyl groups contain 1–4 carbon atoms, vinyl pyridines, styrene, vinyl chloride, vinylidene chloride, alkyl vinyl ethers wherein the alkyl group contains 1–3 carbon atoms, vinyl ketones containing 4–6 carbon atoms, acrylic acid and methacrylic acid, and thereby forming a composite unitary polymer capable of forming high softening, readily dyeable, unsegmented fibers, said graft copolymerizing being effected by heating said mixture in the presence of a polymerization catalyst and 0.05–1.0 mole percent based on the weight of said monomeric material of an alkyl mercaptan wherein the alkyl group contains 4–18 carbon atoms.

6. The method which comprises graft copolymerizing a mixture of 15–35% by weight of cellulose acetate wherein 20–50% of the hydroxyl groups of the cellulose are in free form, and 85–65% by weight of monomeric material consisting of 75–98% by weight of acrylonitrile and 25–2% by weight of isopropenyl acetate, said graft copolymerizing being effected by heating said mixture of cellulose acetate and monomeric material in the presence of a peroxy polymerization catalyst and 0.05–1.0 mole percent based on the weight of said monomeric material of an alkyl mercaptan wherein the alkyl group contains 4–18 carbon atoms.

7. The method which comprises graft copolymerizing a mixture of 15–35% by weight of cellulose acetate wherein 20–50% of the hydroxyl groups of the cellulose are in free form, and 85–65% by weight of monomeric material consisting of 75–98% by weight of acrylonitrile and 25–2% by weight of vinyl acetate based on the weight of said monomeric material, said graft copolymerizing being effected by heating said mixture in the presence of a peroxy polymerization catalyst and 0.05–1.0 mole percent based on said monomeric material of an alkyl mercaptan wherein the alkyl group contains 4–18 carbon atoms.

8. The method which comprises graft copolymerizing a mixture of 15–35% by weight of ethyl cellulose wherein 20–50% of the hydroxyl groups of the cellulose are in free form, and 85–65% by weight of monomeric material consisting of 75–98% by weight of acrylonitrile and 25–2% by weight of $\gamma$-acetoxy-acrylonitrile, said graft copolymerizing being effected by heating said mixture in the presence of a peroxy polymerization catalyst and 0.05–1.0 mole percent based on the weight of said monomeric material of an alkyl mercaptan wherein the alkyl group contains 4–18 carbon atoms.

References Cited in the file of this patent

UNITED STATES PATENTS

| | | |
|---|---|---|
| 2,123,599 | Fikentscher et al. | July 12, 1938 |
| 2,140,048 | Fikentscher et al. | Dec. 13, 1938 |
| 2,336,985 | Freund | Dec. 14, 1943 |
| 2,538,051 | Schick | Jan. 16, 1951 |
| 2,649,434 | Coover et al. | Aug. 18, 1953 |

FOREIGN PATENTS

| | | |
|---|---|---|
| 508,726 | Belgium | July 25, 1952 |

OTHER REFERENCES

High Polymers, volume 5, "Cellulose and Cellulose Derivatives," part II, page 914, published by Interscience Publishing Co.